United States Patent
Maeda et al.

(10) Patent No.: US 7,414,342 B2
(45) Date of Patent: Aug. 19, 2008

(54) ROTOR OF ROTATING ELECTRIC MACHINE AND METHOD OF ASSEMBLING ROTOR OF ROTATING ELECTRIC MACHINE

(75) Inventors: Naohide Maeda, Tokyo (JP); Masahiko Fujita, Tokyo (JP); Shinya Kudoh, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 0 days.

(21) Appl. No.: 11/492,793

(22) Filed: Jul. 26, 2006

(65) Prior Publication Data

US 2007/0035198 A1    Feb. 15, 2007

(30) Foreign Application Priority Data

Aug. 10, 2005   (JP)   ............... 2005-231491

(51) Int. Cl.
*H02K 1/22*    (2006.01)

(52) U.S. Cl. ............... 310/156.72; 310/263; 29/596; 29/598

(58) Field of Classification Search ............... 310/263, 310/156.08, 156.66, 156.72; 29/596–598
See application file for complete search history.

(56) References Cited

U.S. PATENT DOCUMENTS

| | | | |
|---|---|---|---|
| 6,201,335 B1 | 3/2001 | Higashino et al. | |
| 6,333,582 B1* | 12/2001 | Asao et al. | 310/263 |
| 6,369,485 B1* | 4/2002 | Oohashi et al. | 310/263 |
| 6,376,956 B1* | 4/2002 | Hosoya | 310/154.17 |
| 6,548,935 B1* | 4/2003 | Shendi et al. | 310/263 |

FOREIGN PATENT DOCUMENTS

JP    3532130 B2    3/2004

* cited by examiner

*Primary Examiner*—Tran Nguyen
(74) *Attorney, Agent, or Firm*—Sughrue Mion, PLLC

(57) ABSTRACT

A magnet-mounting member for holding permanent magnets against side faces of each claw-shaped magnetic pole has pairs of extreme-end and basal-end hooking tabs for preventing displacement of the permanent magnets in either a basal-end or extreme-end direction. The magnet-mounting member is configured such that a function of the basal-end hooking tabs to prevent displacement of the permanent magnets can be disabled by deforming the basal-end hooking tabs. When the magnet-mounting member is forced onto the claw-shaped magnetic pole, the basal-end hooking tabs go into contact with the permanent magnets and deform outward, whereby the magnet-retaining function of the basal-end hooking tabs is disabled. When the magnet-mounting member has been fully pushed onto the claw-shaped magnetic pole, the basal-end hooking tabs resume an original shape to prevent the permanent magnets from being displaced in either direction.

10 Claims, 4 Drawing Sheets

ROTOR OF ROTATING ELECTRIC MACHINE AND METHOD OF ASSEMBLING ROTOR OF ROTATING ELECTRIC MACHINE

BACKGROUND OF THE INVENTION

1. Field of the Invention

The present invention relates generally to a structure of a rotor of an alternating current (AC) generator or motor, and more particularly, to a structure for mounting permanent magnets in the rotor to prevent leakage of magnetic flux from between facing side faces of adjacent claw-shaped magnetic poles.

2. Description of the Background Art

There exist conventionally known techniques for increasing output of a rotating electric machine whose rotor includes a pair of intermeshed pole core bodies having claw-shaped magnetic poles. One of such techniques is to fit permanent magnets in gaps between one claw-shaped magnetic pole and the next which are arranged along a circumferential direction of the rotor in order to reduce leakage of magnetic flux through the gaps between the adjacent claw-shaped magnetic poles for increasing output of a rotating electric machine.

Japanese Patent Application Publication No. 2001-86715 discloses an arrangement for fixing permanent magnets in gaps between adjacent claw-shaped magnetic poles for preventing magnetic flux leakage through the gaps. According to the Publication, the permanent magnet fitted on each side of every claw-shaped magnetic pole is fixed thereto by means of a reinforcing member having a generally M-shaped or C-shaped cross section in such a manner that the reinforcing member embraces the permanent magnet. With this arrangement, the permanent magnets embraced by respective reinforcing members can be fixed to the claw-shaped magnetic poles in a reliable fashion. Also, the reinforcing members sustain centrifugal force exerted on the permanent magnets as well as flutter-producing force acting on the claw-shaped magnetic poles, so that the reinforcing members serve to mitigate adverse influence of these forces on the permanent magnets. Additionally, each of the reinforcing members has a magnet-retaining structure which prevents the permanent magnets from coming off the reinforcing member in either a basal-end or extreme-end direction thereof.

The claw-shaped magnetic poles are shaped such that an outer surface of each claw-shaped magnetic pole has a generally trapezoidal shape narrowing from a basal end toward an extreme end, and side faces of each claw-shaped magnetic pole also narrow from the basal end toward the extreme end.

This conventional arrangement has a problem that, if the reinforcing members having the aforementioned magnet-retaining structure are to be installed after the permanent magnets have been fitted on both sides of each claw-shaped magnetic pole, it is difficult to install the reinforcing members, because the magnet-retaining structure of each reinforcing member interferes with the permanent magnets. Another problem of the conventional arrangement is that, if the reinforcing members are to be installed after the permanent magnets have been affixed to each reinforcing member, gaps are likely to be created between the permanent magnets and the side faces of each claw-shaped magnetic pole, thereby causing leakage of magnetic flux through the gaps and eventual performance degradation of the rotating electric machine.

SUMMARY OF THE INVENTION

The present invention is intended to solve the aforementioned problems of the prior art. Accordingly, it is an object of the invention to provide a structure of a rotor of a rotating electric machine, the structure including magnet-mounting members for fixing magnets in gaps between adjacent claw-shaped magnetic poles of the rotor in a reliable fashion so that the magnets will not be displaced in either a basal-end or extreme-end direction of the claw-shaped magnetic poles, wherein the structure makes it possible to easily mount the magnet-mounting members on the respective claw-shaped magnetic poles after disposing the magnets between side faces of the adjacent claw-shaped magnetic poles.

According to the invention, a rotor of a rotating electric machine includes a pole core surrounding a rotor coil for generating magnetic flux, the pole core including a first pole core body having claw-shaped magnetic poles and a second pole core body having claw-shaped magnetic poles, the claw-shaped magnetic poles of the first and second pole core bodies extending alternately from opposite directions, intermeshing one another. The rotor further includes a plurality of permanent magnets disposed against both side faces of each of the claw-shaped magnetic poles for reducing leakage of the magnetic flux from between the facing side faces of the adjacent claw-shaped magnetic poles, and a plurality of magnet-mounting members for fixedly holding the permanent magnets against both side faces of each of the claw-shaped magnetic poles. Each of the magnet-mounting members has a generally C-shaped cross section, including a flat, platelike middle portion which fits on an inclined inside surface of each of the claw-shaped magnetic poles, and a pair of magnet-retaining portions formed on both sides of the middle portion for holding two of the permanent magnets on both sides of each of the claw-shaped magnetic poles, each of the magnet-retaining portions having hooking tabs extending therefrom for preventing each of the permanent magnets from being displaced in either a basal-end or extreme-end direction of each of the magnet-mounting members. A magnet-retaining function of the hooking tabs to prevent displacement of the permanent magnets can be disabled by altering an original state of a pair of basal-end hooking tabs of each magnet-mounting member.

In this rotor of the rotating electric machine, the magnet-retaining function of the hooking tabs to prevent displacement of the permanent magnets can be disabled by altering the state of a pair of basal-end hooking tabs of each magnet-mounting member as stated above. This feature of the invention permits disabling the magnet-retaining function of the hooking tabs to prevent displacement of the permanent magnets disposed against both side faces of each of the claw-shaped magnetic poles before fitting the magnet-mounting members on the claw-shaped magnetic poles, making it possible to push the magnet-mounting members onto the respective claw-shaped magnetic poles while preventing the basal-end hooking tabs from interfering with the permanent magnets. As the magnet-mounting members can be easily mounted onto the individual claw-shaped magnetic poles already fitted with the permanent magnets on both sides in this way, the aforementioned structure of the invention serves to provide enhanced ease of assembling the rotor, yet preventing the permanent magnets from being displaced in a reliable fashion after the magnet-mounting members have been mounted on the respective claw-shaped magnetic poles.

According to the invention, a method of assembling a rotor of a rotating electric machine is for assembling a rotor including a pole core surrounding a rotor coil for generating magnetic flux, the pole core including a first pole core body having claw-shaped magnetic poles and a second pole core body having claw-shaped magnetic poles. This method of assembling a rotor includes the steps of disposing a plurality of permanent magnets for reducing leakage of the magnetic flux from between facing side faces of the adjacent claw-shaped magnetic poles against both side faces of each of the claw-shaped magnetic poles, fitting magnet-mounting members on the individual claw-shaped magnetic poles, each of the magnet-mounting members having a generally C-shaped cross section and including a flat, platelike middle portion which fits on an inclined inside surface of each of the claw-shaped magnetic poles, and a pair of magnet-retaining portions formed on both sides of the middle portion for holding two of the permanent magnets on both sides of each of the claw-shaped magnetic poles, each of the magnet-retaining portions having hooking tabs extending therefrom for preventing each of the permanent magnets from being displaced in either a basal-end or extreme-end directions of each of the magnet-mounting members, and forming the pole core by combining the first and second pole core bodies whose claw-shaped magnetic poles have been fitted with the magnet-mounting members with the permanent magnets already disposed against both side faces of each of the claw-shaped magnetic poles in such a manner that the claw-shaped magnetic poles of the first and second pole core bodies extend alternately from opposite directions, intermeshing one another. A magnet-retaining function of the hooking tabs to prevent displacement of the permanent magnets is disabled by altering an original state of a pair of basal-end hooking tabs of each magnet-mounting member when the magnet-mounting members are fitted on the claw-shaped magnetic poles and the magnet-retaining function is re-enabled when the magnet-mounting members have been fitted.

In the aforementioned method of assembling a rotor of a rotating electric machine, the permanent magnets are first disposed against both side faces of each of the claw-shaped magnetic poles and, then, the magnet-mounting members are fitted on the claw-shaped magnetic poles with the magnet-retaining function of the magnet-mounting members disabled by altering the state of the pair of basal-end hooking tabs of each magnet-mounting member. The magnet-retaining function is re-enabled by returning the basal-end hooking tabs to the original state when the magnet-mounting members have been fitted on the individual claw-shaped magnetic poles. This feature of the invention makes it possible to push the magnet-mounting members onto the respective claw-shaped magnetic poles while preventing the basal-end hooking tabs from interfering with the permanent magnets. As the magnet-mounting members can be easily mounted onto the individual claw-shaped magnetic poles already fitted with the permanent magnets on both sides in this way, the aforementioned assembling method of the invention serves to provide enhanced ease of assembling the rotor, yet preventing the permanent magnets from being displaced in a reliable fashion after the magnet-mounting members have been mounted on the respective claw-shaped magnetic poles.

These and other objects, features and advantages of the invention will become more apparent upon a reading of the following detailed description along with the accompanying drawings.

DESCRIPTION OF THE PREFERRED EMBODIMENTS

The invention is now described in detail with reference to specific embodiments which are illustrated in the accompanying drawings.

FIRST EMBODIMENT

Figure 1:
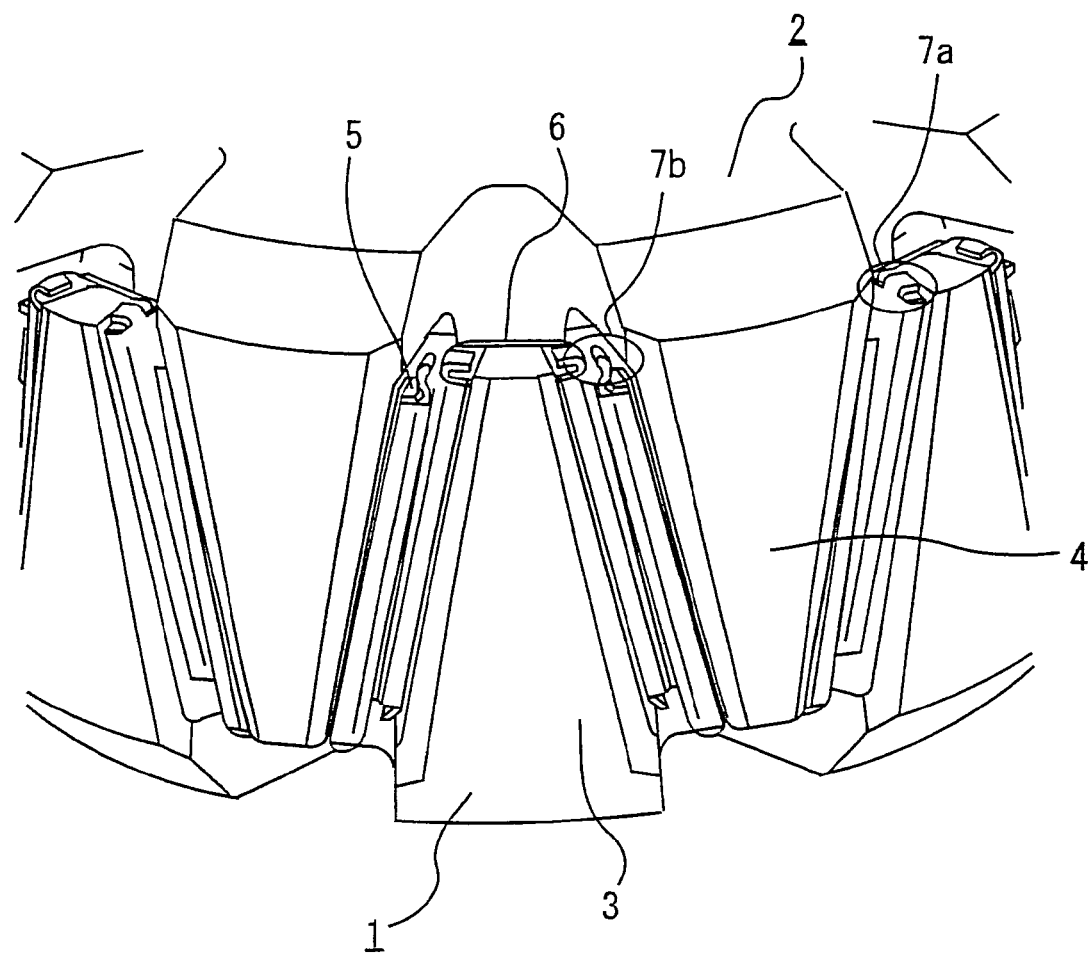
FIG. 1 is a perspective view showing a principal portion of a rotor of a rotating electric machine according to a first embodiment of the invention.

FIG. 1 is a perspective view showing a principal portion of a rotor of a rotating electric machine according to a first embodiment of the invention. Referring to FIG. 1, the rotor includes a pole core made up of a first pole core body 1 and a second pole core body 2, the pole core surrounding a rotor coil (not shown) for producing magnetic flux. The first and second pole core bodies 1, 2 respectively have claw-shaped magnetic poles 3 and 4 which extend alternately from opposite directions intermeshing one another, each of the claw-shaped magnetic poles 3, 4 narrowing from a basal end toward an extreme end. The rotor is provided with permanent magnets 5 which are disposed between facing side faces of the claw-shaped magnetic poles 3, 4 to reduce leakage of the magnetic flux through gaps between the side faces of the adjacent claw-shaped magnetic poles 3, 4. The rotor is further provided with magnet-mounting members 6 for fixedly holding the permanent magnets 5 against both side faces of each of the claw-shaped magnetic poles 3, 4, each of the magnet-mounting members 6 having hooking tabs 7 (including extreme-end hooking tabs 7a and basal-end hooking tabs 7b) so that the permanent magnets 5 would not come off the magnet-mounting members 6 while the rotating electric machine is running.

Figure 2:
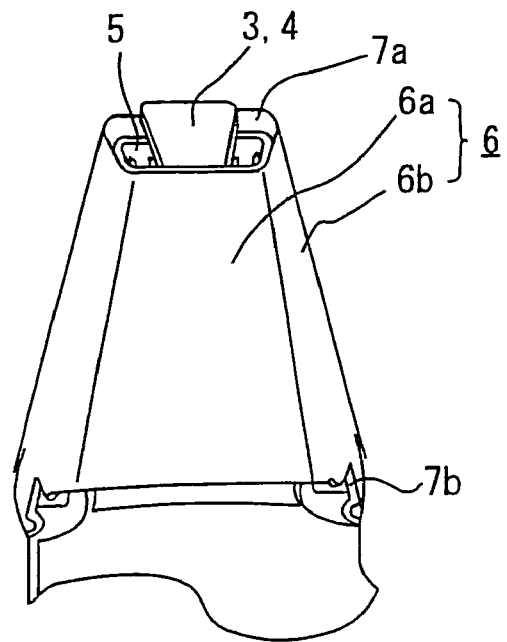
FIG. 2 is a diagram showing how a magnet-mounting member is mounted on one of claw-shaped magnetic poles as viewed obliquely from inside the rotor.
Figure 3:
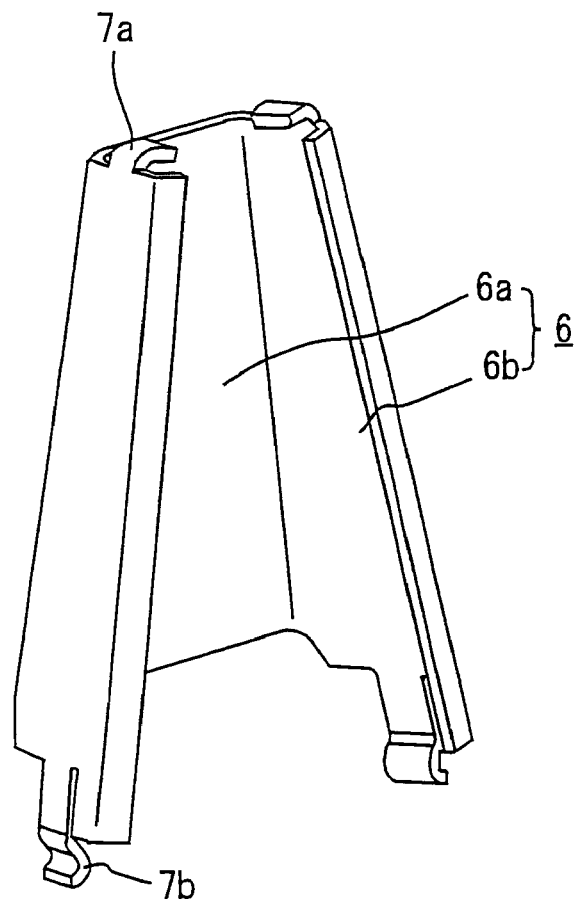
FIG. 3 is a perspective view showing the construction of the magnet-mounting member of the first embodiment.

FIG. 2 is a diagram showing how each of the magnet-mounting members 6 is mounted on one of the claw-shaped magnetic poles 3, 4 as viewed obliquely from inside the rotor, and FIG. 3 is a perspective view showing the construction of the magnet-mounting members 6 of the first embodiment. As illustrated in these Figures, the magnet-mounting member 6 has a flat, platelike middle portion 6a which fits on an inclined inside surface of the claw-shaped magnetic pole 3 (4) and a pair of magnet-retaining portions 6b formed on both sides of the middle portion 6a for holding two of the permanent magnets 5 against the side faces of the claw-shaped magnetic pole 3 (4), the middle portion 6a and the magnet-retaining portions 6b together forming a generally C-shaped cross section. Each of the magnet-retaining portions 6b on both sides of the magnet-mounting member 6 has the aforementioned extreme-end hooking tab 7a at an extreme end and the aforementioned basal-end hooking tab 7b at a basal end for retaining the permanent magnet 5 in position so that the permanent magnet 5 would not be displaced in either a basal-end or extreme-end direction of the magnet-mounting member 6, respectively.

The magnet-mounting members 6 can be easily produced by cutting and bending an approximately 0.5-mm-thick sheet of stainless steel by press working, for instance.

Figure 4:
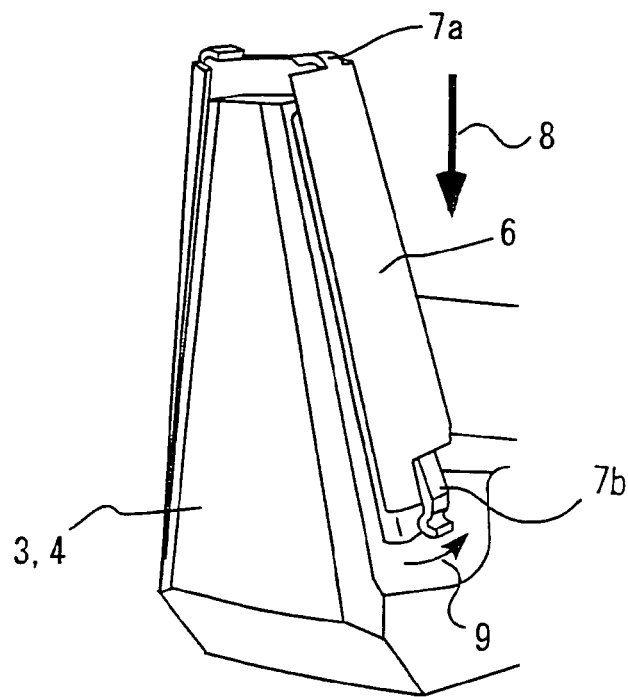
FIG. 4 is a diagram showing how the magnet-mounting member is fitted on each claw-shaped magnetic pole according to the first embodiment.

Referring to FIG. 3, the basal-end hooking tabs 7b of each magnet-mounting member 6 together constitute a snap-in mechanism whereby each magnet-mounting member 6 can be easily mounted on the claw-shaped magnetic pole 3 (4). More specifically, when each magnet-mounting member 6 is pushed onto the claw-shaped magnetic pole 3 (4), the basal-end hooking tabs 7b deform outward, temporarily disabling the aforementioned function of the basal-end hooking tabs 7b to retain the permanent magnets 5 in position. FIG. 4 is a diagram showing how the magnet-mounting member 6 is fitted on each claw-shaped magnetic pole 3 (4).

The magnet-mounting member 6 is mounted over the claw-shaped magnetic pole 3 (4) from the narrow extreme end thereof along an axial direction 8 as shown by an arrow in FIG. 4. It is to be noted that the permanent magnets 5 are already disposed on both sides of the claw-shaped magnetic pole 3 (4) before the magnet-mounting member 6 is mounted thereon. When the magnet-mounting member 6 is forced onto the claw-shaped magnetic pole 3 (4), the basal-end hooking tabs 7b on both sides go into contact with the permanent magnets 5 and deform in outward directions 9 as illustrated, whereby the magnet-retaining function of the basal-end hooking tabs 7b is temporarily disabled. When the magnet-mounting member 6 has been fully pushed onto the claw-shaped magnetic pole 3 (4), the basal-end hooking tabs 7b are released from the permanent magnets 5 and return to their original positions, thereby preventing the permanent magnets 5 from being displaced in either the basal-end or extreme-end direction of the magnet-mounting member 6.

According to the above-described structure of the first embodiment, each of the magnet-mounting members 6 has the extreme-end hooking tabs 7a and the basal-end hooking tabs 7b so that the permanent magnets 5 would be held in position without being displaced in the extreme-end or basal-end direction of the magnet-mounting member 6, the basal-end hooking tabs 7b having flexibility to deform outward making it possible to disable and re-enable the function of retaining the permanent magnets 5 in position. This feature of the embodiment allows the basal-end hooking tabs 7b to deform outward, temporarily disabling their magnet-retaining function, when the magnet-mounting member 6 is being mounted on each claw-shaped magnetic pole 3 (4) which is already fitted with the permanent magnets 5 on both sides. This makes it possible to push the magnet-mounting member 6 onto each claw-shaped magnetic pole 3 (4) while preventing the basal-end hooking tabs 7b from interfering with the permanent magnets 5 so that the magnet-mounting member 6 can be mounted on each claw-shaped magnetic pole 3 (4) without mechanical disturbances.

As the magnet-mounting member 6 can be easily mounted onto each claw-shaped magnetic pole 3 (4) already fitted with the permanent magnets 5 on both sides in this way, the structure of the first embodiment serves to provide enhanced ease of assembling the rotor, yet preventing the permanent magnets 5 from being displaced in a reliable fashion after the magnet-mounting member 6 has been mounted on each claw-shaped magnetic pole 3 (4). In addition, as the structure of the embodiment permits installation of the magnet-mounting members 6 on the respective claw-shaped magnetic poles 3, 4 after disposing the permanent magnets 5 at correct positions facing the side faces of the claw-shaped magnetic poles 3, 4 where the permanent magnets 5 produce an appreciable effect in reducing leakage of the magnetic flux, it becomes possible to make efficient use of the flux leakage reducing effect of the permanent magnets 5.

SECOND EMBODIMENT

Figure 5:
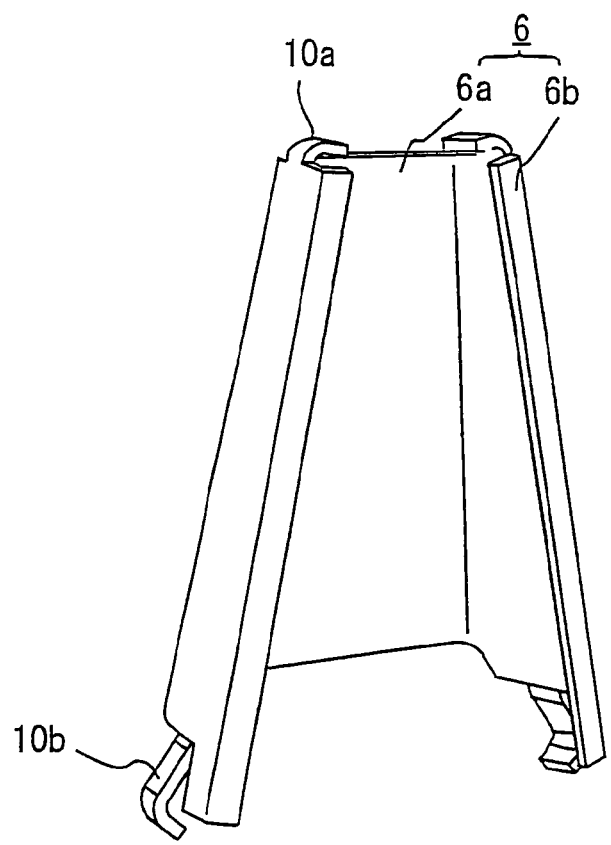
FIG. 5 is a perspective view showing the construction of a magnet-mounting member according to a second embodiment of the invention.

FIG. 5 is a perspective view showing the construction of a magnet-mounting member 6 according to a second embodiment of the invention. Like the magnet-mounting member 6 of the first embodiment, the magnet-mounting member 6 of this embodiment has a flat, platelike middle portion 6a which fits on an inclined inside surface of each claw-shaped magnetic pole 3 (4) and a pair of magnet-retaining portions 6b formed on both sides of the middle portion 6a for holding permanent magnets 5 against side faces of the claw-shaped magnetic pole 3 (4), the middle portion 6a and the magnet-retaining portions 6b together forming a generally C-shaped cross section as illustrated. Each of the magnet-retaining portions 6b on both sides of the magnet-mounting member 6 has an extreme-end hooking tab 10a at an extreme end and a basal-end hooking tab 10b at a basal end for retaining the permanent magnet 5 in position so that the permanent magnet 5 would not be displaced in either a basal-end or extreme-end direction of the magnet-mounting member 6, respectively.

Figure 6:
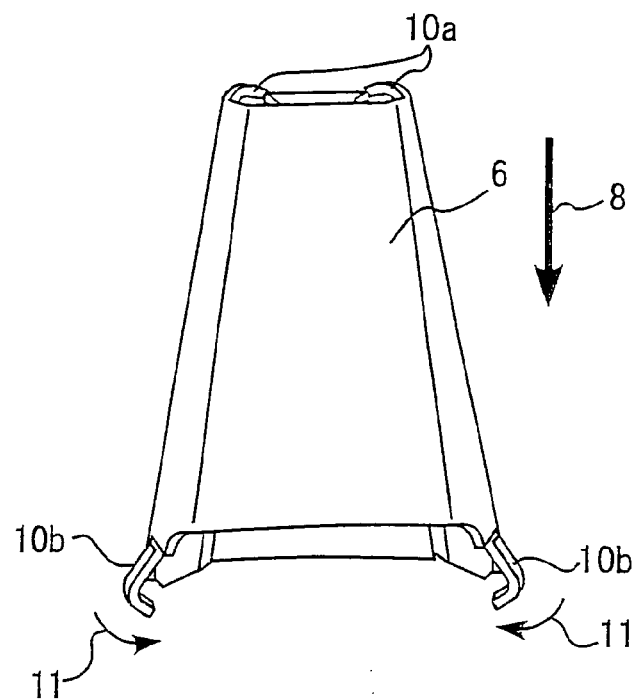
FIG. 6 is a diagram showing a state of the magnet-mounting member before the same is fitted on each claw-shaped magnetic pole according to the second embodiment.

The basal-end hooking tabs 10b projecting obliquely from the magnet-retaining portions 6b of the magnet-mounting member 6 on both sides thereof have flexibility to deform outward so that a function of the basal-end hooking tabs 10b to retain the permanent magnets 5 in position can be temporarily disabled by altering the directions of projection of the individual basal-end hooking tabs 10b. Specifically, the projecting directions of the basal-end hooking tabs 10b are altered to temporarily disable the magnet-retaining function of the basal-end hooking tabs 10b before the magnet-mounting member 6 is pushed onto each claw-shaped magnetic pole 3 (4). FIG. 6 is a diagram showing a state of the magnet-mounting member 6 before the same is fitted on each claw-shaped magnetic pole 3 (4).

The magnet-mounting member 6 is mounted over the claw-shaped magnetic pole 3 (4) from the narrow extreme end thereof along an axial direction 8 as shown by an arrow in FIG. 6. It is to be noted that the permanent magnets 5 are already disposed on both sides of the claw-shaped magnetic pole 3 (4) before the magnet-mounting member 6 is mounted thereon. Before the magnet-mounting member 6 is pushed onto the claw-shaped magnetic pole 3 (4), the projecting directions of the basal-end hooking tabs 10b are altered to disable the magnet-retaining function thereof by bending the basal-end hooking tabs 10b outward so that the basal-end hooking tabs 10b on both sides of the magnet-mounting member 6 would not go into contact with the permanent magnets 5. When the magnet-mounting member 6 has been fully pushed onto the claw-shaped magnetic pole 3 (4), the projecting directions of the basal-end hooking tabs 10b are altered again to return the basal-end hooking tabs 10b back to their original positions in inward directions 11 as illustrated, whereby the magnet-retaining function of the basal-end hooking tabs 10b is re-enabled to prevent the permanent magnets 5 from being displaced in either the basal-end or extreme-end direction of the magnet-mounting member 6.

According to the above-described structure of the second embodiment, the magnet-retaining function of the basal-end hooking tabs 10b is disabled so that the basal-end hooking tabs 10b would not go into contact with the permanent magnets 5 before the magnet-mounting member 6 is mounted on each claw-shaped magnetic pole 3 (4) which is already fitted with the permanent magnets 5 on both sides. This makes it possible to push the magnet-mounting member 6 onto each claw-shaped magnetic pole 3 (4) while preventing the basal-end hooking tabs 10*b* from interfering with the permanent magnets 5 so that the magnet-mounting member 6 can be mounted on each claw-shaped magnetic pole 3 (4) without mechanical disturbances.

As the magnet-mounting member 6 can be easily mounted onto each claw-shaped magnetic pole 3 (4) already fitted with the permanent magnets 5 on both sides in this way, the structure of the second embodiment serves to provide enhanced ease of assembling the rotor, yet preventing the permanent magnets 5 from being displaced in a reliable fashion after the magnet-mounting member 6 has been mounted on each claw-shaped magnetic pole 3 (4). In addition, as the structure of the embodiment permits installation of the magnet-mounting members 6 on the respective claw-shaped magnetic poles 3, 4 after disposing the permanent magnets 5 at correct positions facing the side faces of the claw-shaped magnetic poles 3, 4 where the permanent magnets 5 produce an appreciable effect in reducing leakage of the magnetic flux, it becomes possible to make efficient use of the flux leakage reducing effect of the permanent magnets 5.

In the above-described second embodiment, the magnet-retaining function of the basal-end hooking tabs 10*b* is re-enabled to prohibit displacement of the permanent magnets 5 disposed inside the magnet-mounting member 6 by altering the projecting directions of the basal-end hooking tabs 10*b* to return the basal-end hooking tabs 10*b* back to their original positions in the inward directions 11 upon completion of installation of the magnet-mounting member 6. The second embodiment may be modified such that this process of altering the projecting directions of the basal-end hooking tabs 10*b* for returning the basal-end hooking tabs 10*b* back to their original positions in the inward directions 11 is automatically accomplished when the first and second pole core bodies 1, 2 are engaged with each other in a subsequent process as shown in FIG. 7.

Figure 7:
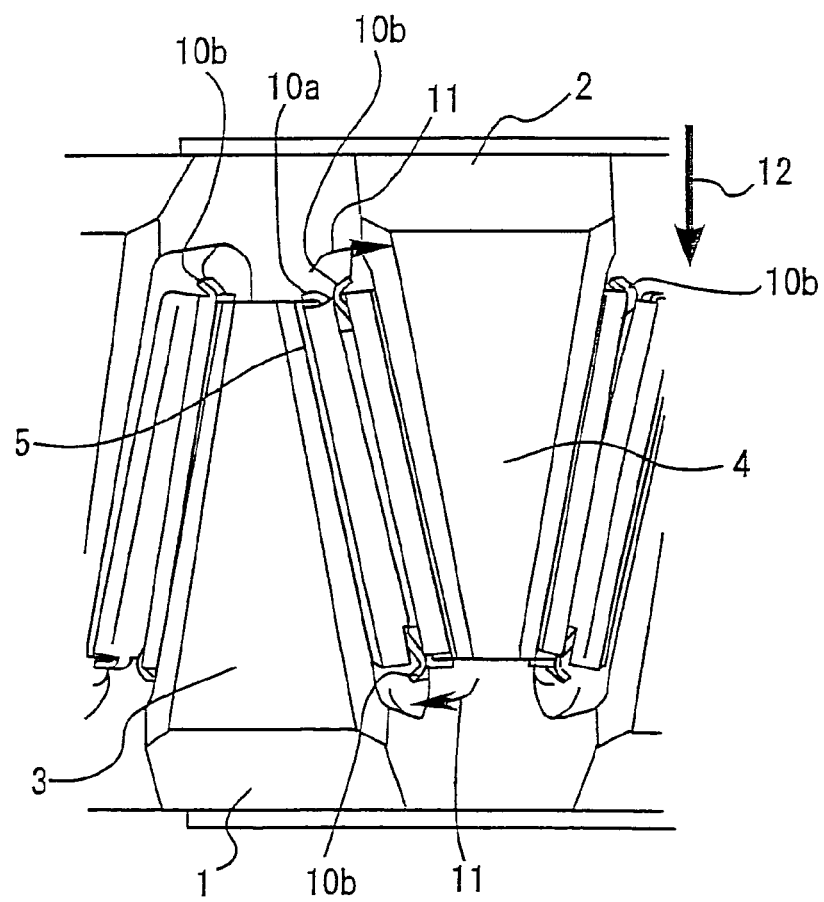
FIG. 7 is a diagram showing a method of assembling a rotor in one variation of the second embodiment of the invention.

In this modified method of assembling a rotor, the first and second pole core bodies 1, 2 are engaged with each other by moving the second pole core body 2 in an arrow direction 12, for example, upon completion of installation of the magnet-mounting members 6 on the respective claw-shaped magnetic poles 3, 4 as illustrated in FIG. 7. When the second pole core body 2 is moved in the arrow direction 12 to assemble the same with the first pole core body 1, the basal-end hooking tabs 10*b* of the magnet-mounting members 6 mounted on one of the pole core bodies 1, 2 are brought into contact with and forced against the magnet-mounting members 6 mounted on the other of the pole core bodies 1, 2, so that the projecting directions of the individual basal-end hooking tabs 10*b* are automatically altered in the inward directions 11. As a result, the basal-end hooking tabs 10*b* return to their original positions and resume the magnet-retaining function, thereby prohibiting displacement of the permanent magnets 5 in a reliable fashion. This variation of the second embodiment obviates the need for a separate process of altering the projecting directions of the basal-end hooking tabs 10*b* for returning the basal-end hooking tabs 10*b* back to their original positions in the inward directions 11, contributing thereby to achieving enhanced ease of assembling the rotor.

In the aforementioned methods of assembling the rotor of the first and second embodiments, the permanent magnets 5 disposed on both sides of each claw-shaped magnetic pole 3 (4) may be affixed to the side faces thereof at specified positions by use of a bonding agent before the magnet-mounting members 6 are mounted on the respective claw-shaped magnetic poles 3, 4. This structure makes it possible to locate the permanent magnets 5 at proper positions facing the side faces of the claw-shaped magnetic poles 3, 4 where the permanent magnets 5 produce an appreciable effect in reducing leakage of the magnetic flux in a reliable fashion. Also, this structure serves to prevent displacement of the permanent magnets 5 and interference between the magnet-mounting members 6 and the permanent magnets 5 at unexpected sites potentially occurring when the magnet-mounting members 6 are mounted on the claw-shaped magnetic poles 3, 4 as well as interference between the basal-end hooking tabs 7*b* (10*b*) and the permanent magnets 5 potentially occurring when the basal-end hooking tabs 7*b* (10*b*) of the magnet-mounting members 6 are reshaped, contributing thereby to protect the basal-end hooking tabs 7*b* (10*b*) and the permanent magnets 5 from breakage. Furthermore, this structure of the invention is advantageous in that the bonding agent used for affixing the permanent magnets 5 to the each claw-shaped magnetic pole 3 (4) may be of a low-cost, quick-curing type with no heat-resistant property, thus contributing to overall cost reduction of the rotor, because an external force exerted on the permanent magnets 5 when the rotor rotates is sustained by the magnet-mounting members 6, and not by the bonding agent.

Alternatively, the rotor of the aforementioned first and second embodiments may be structured such that the magnet-mounting members 6 are fixed to the respective claw-shaped magnetic poles 3, 4 by welding after the magnet-mounting member 6 has been mounted on each claw-shaped magnetic pole 3 (4). This structure makes it possible to reliably affix the magnet-mounting members 6 to the magnetic poles 3, 4 with high strength and durability.

Moreover, in one feature of the invention, the methods of assembling the rotor of the first and second embodiments may be such that the permanent magnets 5 are magnetized upon completion of machining operation in a process of assembling the rotor, that is, after the pole core has been formed by engaging the first and second pole core bodies 1, 2 with each other. This approach makes it possible to prevent adhesion of foreign material like chips and shavings of metal removed during the machining operation to the permanent magnets 5, thereby preventing such failures as breakage of the rotor coil and damage to the permanent magnets 5 by the foreign material.

What is claimed is:

1. A rotor of a rotating electric machine, said rotor comprising:

a pole core surrounding a rotor coil for generating magnetic flux, said pole core including a first pole core body having claw-shaped magnetic poles and a second pole core body having claw-shaped magnetic poles, the claw-shaped magnetic poles of the first and second pole core bodies extending alternately from opposite directions, and intermeshing with one another;

a plurality of permanent magnets disposed against both side faces of each of the claw-shaped magnetic poles for reducing leakage of the magnetic flux from between the facing side faces of the adjacent claw-shaped magnetic poles; and a plurality of magnet-mounting members for fixedly holding said permanent magnets against both side faces of each of the claw-shaped magnetic poles, each of said magnet-mounting members having a substantially C-shaped cross section and including:

a flat, platelike middle portion which fits on an inclined inside surface of each of the claw-shaped magnetic poles; and a pair of magnet-retaining portions formed on both sides of the middle portion for holding two of said permanent magnets on both sides of each of the claw-shaped magnetic poles, each of the magnet-retaining portions having hooking tabs extending therefrom for preventing each of said permanent magnets from being displaced in either of basal-end and extreme-end directions of each of said magnet-mounting members;

wherein the hooking tabs are configured with a depressible mechanism that temporarily disables a function of the hooking tab by varying a direction of the hooking tab.

2. A rotor of a rotating electric machine according to claim 1, wherein the hooking tabs extending from each of the magnet-retaining portions include an extreme-end hooking tab provided at an extreme end of the each of said magnet-mounting members and a basal-end hooking tab provided at a basal end of each of said magnet-mounting members, and the magnet-retaining function being capable of being disabled by varying a projecting direction of only the basal-end hooking tab.

3. A rotor of a rotating electric machine according to claim 1, wherein said permanent magnets are bonded to both side faces of each of the claw-shaped magnetic poles.

4. A rotor of a rotating electric machine according to claim 1, wherein said magnet-mounting members are welded to the respective claw-shaped magnetic poles.

5. A method of assembling a rotor of a rotating electric machine, wherein said rotor comprises:
   a pole core surrounding a rotor coil for generating magnetic flux, said pole core including a first pole core body having claw-shaped magnetic poles and a second pole core body having claw-shaped magnetic poles, the claw-shaped magnetic poles of the first and second pole core bodies extending alternately from opposite directions, and intermeshing with one another;
   a plurality of permanent magnets disposed against both side faces of each of the claw-shaped magnetic poles for reducing leakage of the magnetic flux from between the facing side faces of the adjacent claw-shaped magnetic poles; and
   a plurality of magnet-mounting members for fixedly holding said permanent magnets against both side faces of each of the claw-shaped magnetic poles, each of said magnet-mounting members having a substantially C-shaped cross section and including:
   a flat, platelike middle portion which fits on an inclined inside surface of each of the claw-shaped magnetic poles; and
   a pair of magnet-retaining portions formed on both sides of the middle portion for holding two of said permanent magnets on both sides of each of the claw-shaped magnetic poles, each of the magnet-retaining portions having hooking tabs extending therefrom for preventing each of said permanent magnets from being displaced in either of a basal-end direction and extreme-end direction of each of said magnet-mounting members, wherein the hooking tabs are configured with a depressible mechanism that temporarily disables a function of the hooking tabs by varying a direction of the hooking tabs, said method comprising the steps of:

disposing a plurality of permanent magnets for reducing leakage of the magnetic flux from between facing side faces of the adjacent claw-shaped magnetic poles against both side faces of each of the claw-shaped magnetic poles;

fitting magnet-mounting members on the individual claw-shaped magnetic poles, each of said magnet-mounting members having a generally C-shaped cross section and including a flat, platelike middle portion which fits on an inclined inside surface of each of the claw-shaped magnetic poles, and a pair of magnet-retaining portions formed on both sides of the middle portion for holding two of said permanent magnets on both sides of each of the claw-shaped shaped magnetic poles, each of the magnet-retaining portions having hooking tabs extending therefrom for preventing each of said permanent magnets from being displaced in either of basal-end and extreme-end directions of each of said magnet-mounting members; and forming said pole core by combining the first and second pole core bodies whose claw-shaped magnetic poles have been fitted with said magnet-mounting members with said permanent magnets already disposed against both side faces of each of the claw-shaped magnetic poles in such a manner that the claw-shaped magnetic poles of the first and second pole core bodies extend alternately from opposite directions, intermeshing one another;

wherein a magnet-retaining function of the hooking tabs to prevent displacement of said permanent magnets is disabled by altering an original state of at least one of the hooking tabs of each magnet-mounting member when said magnet-mounting members are fitted on the claw-shaped magnetic poles and the magnet-retaining function is re-enabled when said magnet-mounting members have been fitted.

6. A method of assembling a rotor of a rotating electric machine according to claim 5, wherein said magnet-mounting members are mounted over the respective claw-shaped magnetic poles with said permanent magnets already disposed against both side faces of each of the claw-shaped magnetic poles from an extreme end thereof along an axial direction, and wherein at least one of the hooking tabs of each magnet-mounting member goes into contact with one of said permanent magnets and varies from the original state when said magnet-mounting members are mounted and said at least one of the hooking tabs comes off and returns to the original state when said magnet-mounting members have been mounted in position.

7. A method of assembling a rotor of a rotating electric machine according to claim 5, wherein said magnet-mounting members are mounted over the respective claw-shaped magnetic poles with said permanent magnets already disposed against both side faces of each of the claw-shaped magnetic poles from an extreme end thereof along an axial direction, and wherein at least one of the hooking tabs of each magnet-mounting member is varied from the original state so as not to go into contact with any of said permanent magnets before said magnet-mounting members are mounted and said at least one of the hooking tabs is returned to the original state when said magnet-mounting members have been mounted in position.

8. A method of assembling a rotor of a rotating electric machine according to claim 7, wherein said at least one of the hooking tabs of each magnet-mounting member is returned to the original state when the first and second pole core bodies are combined with each other upon completion of said step of fitting said magnet-mounting members on the individual claw-shaped magnetic poles.

9. A method of assembling a rotor of a rotating electric machine according to claim 5, wherein said permanent magnets are bonded to each of the claw-shaped magnetic poles in said step of disposing said permanent magnets against both side faces of each of the claw-shaped magnetic poles.

10. A method of assembling a rotor of a rotating electric machine according to claim 5, wherein said permanent magnets are magnetized upon completion of said step of combining the first and second pole core bodies with each other.

* * * * *